US008829893B2

(12) United States Patent
Youngner et al.

(10) Patent No.: US 8,829,893 B2
(45) Date of Patent: Sep. 9, 2014

(54) LINEAR POSITION SENSOR

(75) Inventors: Daniel Youngner, Maple Grove, MN (US); Lisa Lust, Plymouth, MN (US); Douglas R. Carlson, Woodbury, MN (US); Kelly Muldoon, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 149 days.

(21) Appl. No.: 13/564,379

(22) Filed: Aug. 1, 2012

(65) Prior Publication Data
US 2013/0063132 A1 Mar. 14, 2013

Related U.S. Application Data

(60) Provisional application No. 61/532,851, filed on Sep. 9, 2011.

(51) Int. Cl.
*G01R 35/00* (2006.01)
*G01B 7/14* (2006.01)
*G01B 7/30* (2006.01)
*G01D 5/06* (2006.01)
*G01D 5/14* (2006.01)

(52) U.S. Cl.
CPC . *G01D 5/06* (2013.01); *G01D 5/145* (2013.01)
USPC .................. 324/202; 324/207.21; 324/207.24

(58) Field of Classification Search
CPC ....... G01D 5/145; G01D 18/00; G01D 5/252; F15B 15/1447; G01B 7/003
USPC ................................ 324/202, 207.21, 207.24
See application file for complete search history.

(56) References Cited

U.S. PATENT DOCUMENTS

| 6,619,039 | B2 | 9/2003 | Zehnder, II et al. |
| 6,919,719 | B2 | 7/2005 | Reininger |
| 7,263,781 | B2 | 9/2007 | Sielemann |
| 7,377,333 | B1 | 5/2008 | Sugiura |
| 7,394,244 | B2 | 7/2008 | Schley et al. |
| 2009/0278641 | A1 | 11/2009 | Hedayat |
| 2011/0120300 | A1 | 5/2011 | Fletcher et al. |

FOREIGN PATENT DOCUMENTS

| WO | 2007137693 A2 | 12/2007 |
| WO | 2009/049770 A1 | 4/2009 |
| WO | 2010/007357 A1 | 1/2010 |

OTHER PUBLICATIONS

Daughton, "Spin-Dependent Sensors", Proceedings of the IEEE, vol. 91, No. 5, May 2003, 6 pages.
Reininger et al., "Sensors in Position Control Applications for Industrial Automation", Sensors and Actuators A, 129 (2006) 270-274.
International Search Report and Written Opinion for corresponding PCT Application No. PCT/US2012/053737, dated Feb. 15, 2013, 9 pages.

*Primary Examiner* — Reena Aurora
(74) *Attorney, Agent, or Firm* — Craige Thompson; Thompson Patent Law Offices

(57) ABSTRACT

In general, the disclosure is directed to techniques for determining the position of a piston within a linear actuator, such as a hydraulic cylinder, in a more cost effective and less labor-intensive fashion compared to current techniques for determining the position of a piston within a linear actuator. One or more magnets may be operably coupled to the piston, and a linear array of sensors may be disposed along an exterior length of the linear actuator. The sensors may measure the magnetic field generated by the magnet and, based on the measured magnetic field, may determine the location of the piston within the linear actuator.

19 Claims, 12 Drawing Sheets

LINEAR POSITION SENSOR

This application claims the benefit of U.S. Provisional Application No. 61/532,851, filed Sep. 9, 2011, the entire content of which is incorporated herein by reference.

TECHNICAL FIELD

The disclosure relates to hydraulic cylinders, and more specifically, to techniques for determining the linear position of a piston within a hydraulic cylinder.

BACKGROUND

Hydraulic cylinders are often integrated into heavy equipment such as backhoes and excavators to provide force for controlling, for example, the linkages and components of the heavy equipment. Typically, a piston may be enclosed within the hydraulic cylinder, and the piston may be connected to a piston rod that travels reciprocally within the hydraulic cylinder. Hydraulic fluid within the cylinder may act on the piston to cause the piston and a piston rod connected to the piston to control the heavy equipment's linkages and components. It is often desirable to determine the position of the piston within the hydraulic cylinder so as to determine the position of components coupled to the hydraulic cylinder. However, it can be difficult to determine the position of the piston due to the piston being sealed in the hydraulic cylinder.

SUMMARY

In general, the disclosure is directed to techniques for determining the position of a piston within a linear actuator, such as a hydraulic cylinder, in a more cost effective and less labor-intensive fashion compared to current techniques for determining the position of a piston within a linear actuator. One or more magnets may be operably coupled to the piston, and a linear array of sensors may be disposed along an exterior length of the linear actuator. The sensors can measure the magnetic field generated by the magnet and, based on the measured magnetic field, may determine the location of the piston within the linear actuator.

In one aspect, the disclosure is directed to an apparatus. The apparatus may include a housing, and a piston including first and second end surfaces. The piston may be cylindrical, disposed within the housing, and operable to move reciprocally within the housing. The apparatus may further include one or more magnets operably coupled to the piston, wherein the one or more magnets are disposed radial or tangential to the circumference of a first end surface or a second end surface of the piston. The apparatus may further include a plurality of sensors disposed on an exterior of the housing and configured to sense a magnetic field produced by the one or more magnets to determine a position of the piston within the housing.

In another aspect, the disclosure is directed to a method. The method may include calibrating a plurality of sensors disposed on an exterior of a linear actuator to normalize output of the plurality of sensors. The method may further include measuring, by the plurality of sensors, a magnetic field produced by one or more magnets operably coupled to a piston within the linear actuator, wherein the one or more magnets are disposed radial or tangential to the circumference of a first end surface or a second end surface of the piston. The method may further include determining, based on output from the plurality of sensors, a position of the piston within the linear actuator.

The details of one or more aspects of the disclosure are set forth in the accompanying drawings and the description below. Other features, objects, and advantages of the disclosure will be apparent from the description and drawings, and from the claims.

DETAILED DESCRIPTION

Figure 1A:
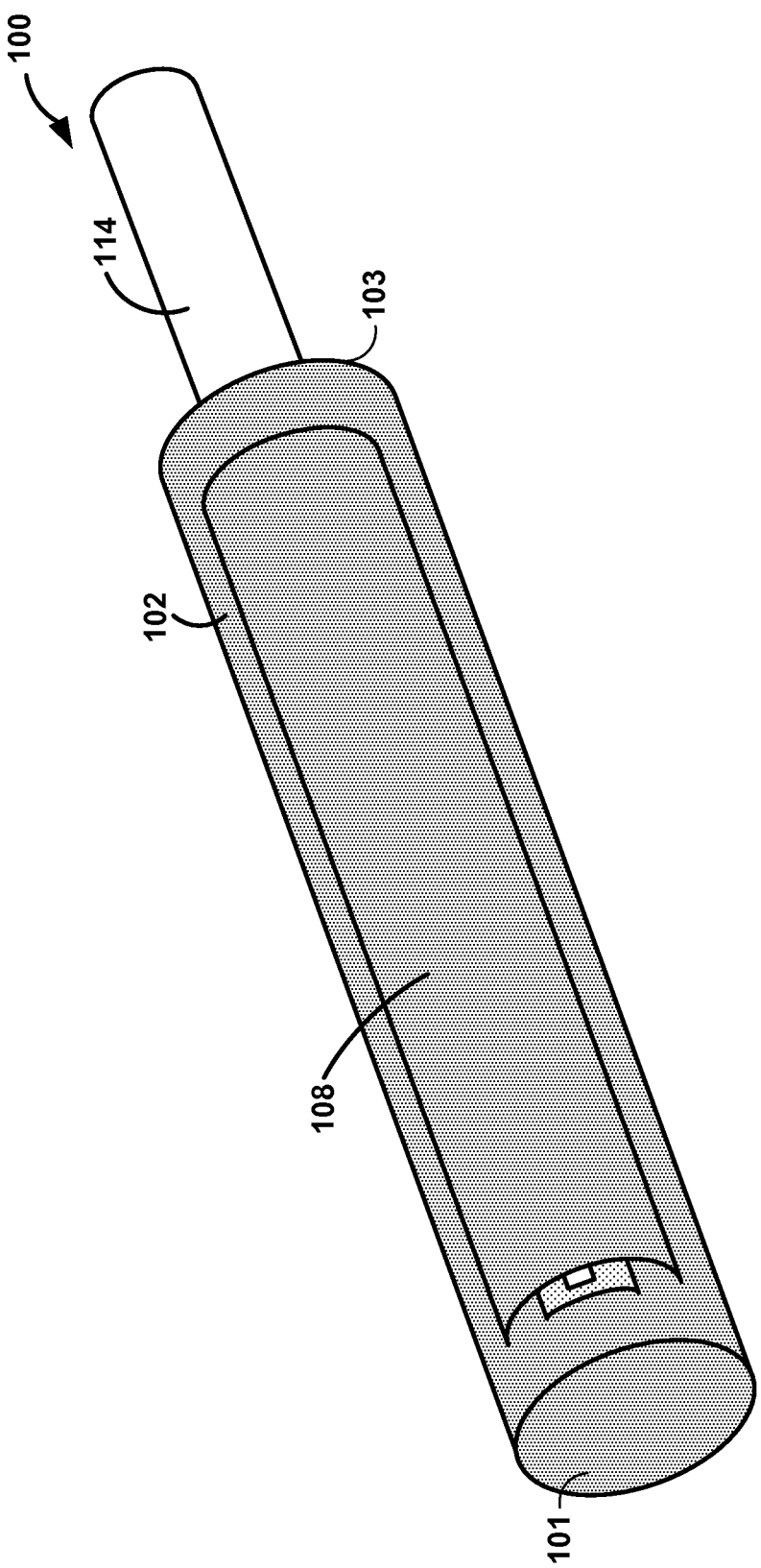
FIG. 1A is a conceptual diagram showing a perspective view of an example linear actuator according to aspects of the present disclosure.
Figure 1B:
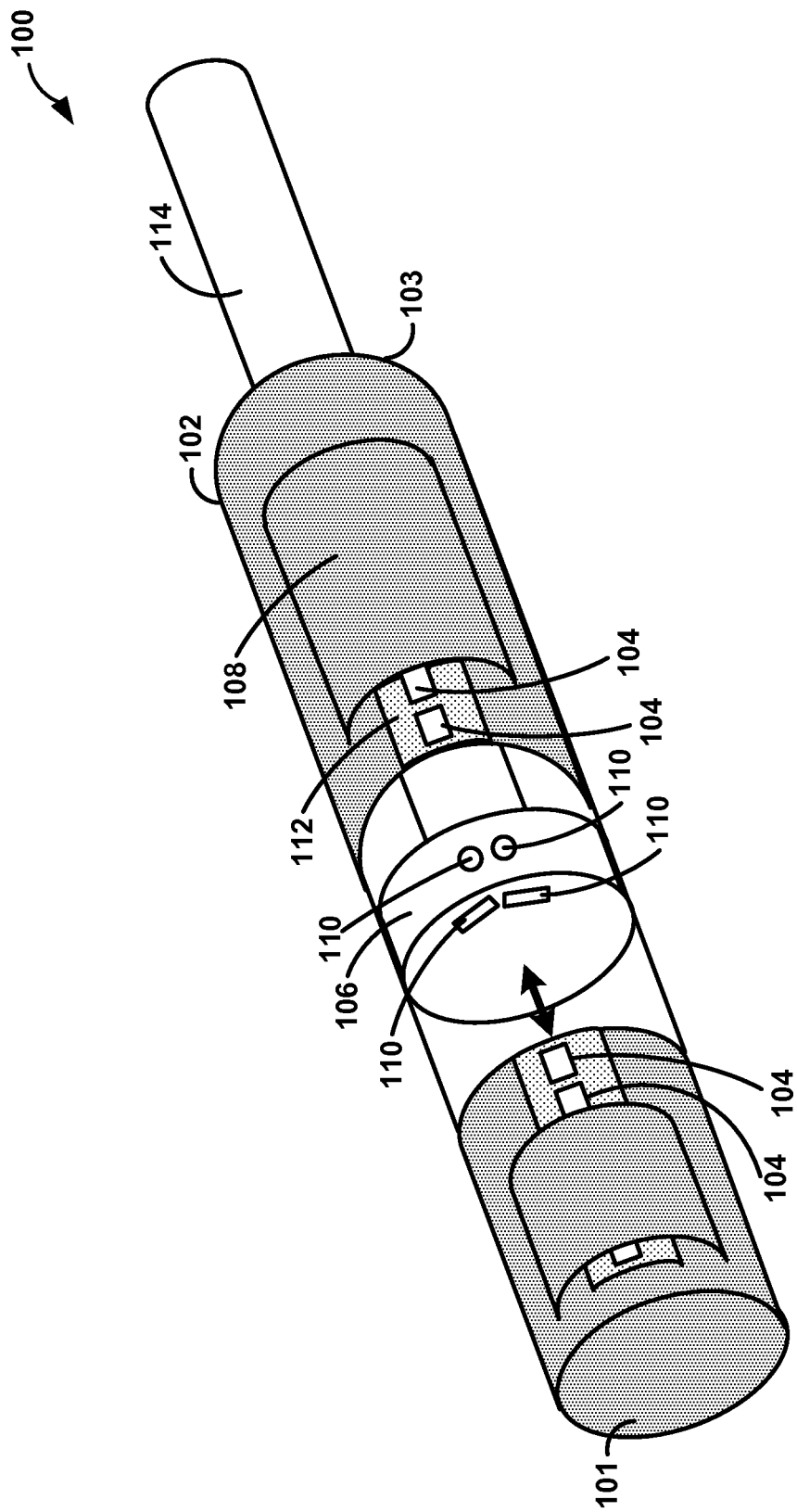
FIG. 1B is a conceptual diagram showing a partially cutaway perspective view of an example linear actuator according to aspects of the disclosure.
Figure 1C:
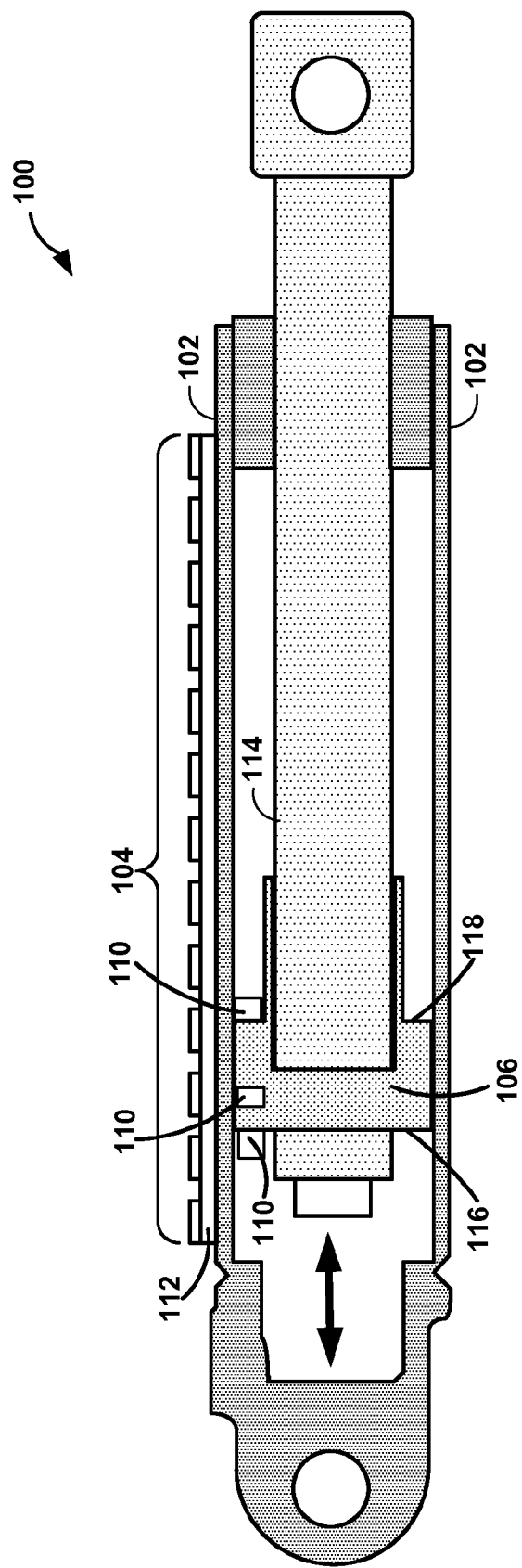
FIG. 1C is a conceptual diagram showing a sectioned view of an example linear actuator according to aspects of the disclosure.

FIG. 1A is a conceptual diagram showing a perspective view of an example linear actuator according to aspects of the present disclosure. FIG. 1B is a conceptual diagram showing a partially cutaway perspective view of an example linear actuator according to aspects of the disclosure. FIG. 1C is a graphical diagram showing a sectioned view of an example linear actuator according to aspects of the disclosure. As shown in FIGS. 1A-1C, linear actuator 100 may be a hydraulic cylinder and may include housing 102. Housing 102 may be a cylinder and made of metal, such as steel, and the cylinder may have a cap end 101 and a rod end 103. The thickness of the walls of housing 102, in some examples, may be approximately 6 millimeters (mm). Piston 106 may be disposed within housing 102 and may be operably coupled to piston rod 114. Piston rod 104 may be driven so that piston rod 114 drives piston 106 to move reciprocally within housing 102 between cap end 101 and rod end 103 of the cylinder axially with respect to the length of the cylinder. In some examples, piston 106 may define a radius of approximately 40 mm and a thickness of approximately 20 mm.

In order to measure the linear position of piston 106 within housing 102, magnets 110 may be operably coupled to piston 106 and a linear array of sensors 104 may be disposed along an exterior length of housing 102, along and parallel to the path of movement of piston 106, so that sensors 104 may detect the magnetic field generated by magnets 110. Because magnets 110 are coupled to piston 106, sensors 104 may determine the position of piston 106 within housing 102 by determining the position of magnets 110 within housing 102 based on measuring the magnetic field generated by magnet 110.

Magnets 110 may include any ferrous object capable of producing a magnetic field, such as permanent magnets made of neodymium. Magnets 110 may be coupled to the external surfaces of piston 106 or may be embedded within piston 106. Sensors 104 may include any sensor capable of detecting the magnetic field produced by magnets 110, such as an anisotropic magneto-resistance (AMR) sensor or a magnetic tunnel effect (TMR) sensor. In some examples, sensors 104 may measure the magnitude of the magnetic field produced by magnets 110. In other examples, sensors 104 may measure the direction and/or a combination of the magnitude and the direction of the magnetic field produced by magnets 110. In some examples, for a piston having a travel distance of about 80 cm, about 120-130 sensors 104 may be disposed on housing 102 running along the length of housing 102 parallel to the path of travel of piston 106.

Sensors 104 may be operably coupled to sensor board 112, which may be operably coupled to the exterior of housing 102. In some examples, sensor board 112 may deliver current to and from sensors 104, receive the output from sensors 104, and determine the position of piston 106 based on the output from sensors 104. Sensors 104 and sensor board 112 may be covered by protective housing 108 so as to protect sensors 104 from the influences of external magnetic fields or other electromagnetic noise. In some examples, protective housing 108 may comprise metal, such as steel, and may define a thickness of approximately 4 mm.

Sensor board 112 may include a calibration module operable to calibrate sensors 104. The calibration module may include a combination of hardware and/or software, and may be operable to send and receive signals to and from sensors 104, and may also be operable to control the movement of piston rod 114 and piston 106. In some examples, the calibration module may not be included in sensor board 112, but may be otherwise coupled to linear actuator 100.

Piston 106 may include surfaces 116 and 118. Surface 116 of piston 106 may face towards cap end 101 of housing 102, and surface 118 of piston 106 may face towards rod end 103 of housing 102, so that surfaces 116 and 118 is parallel to the travel path of piston 106. Piston 106 may be driven by piston rod 114 to travel between cap end 101 and rod end 103 of housing 102, so that piston 106 may work against hydraulic fluid (not shown) disposed between surface 116 of piston 106 and cap end 101 of housing 102.

Figure 2A:
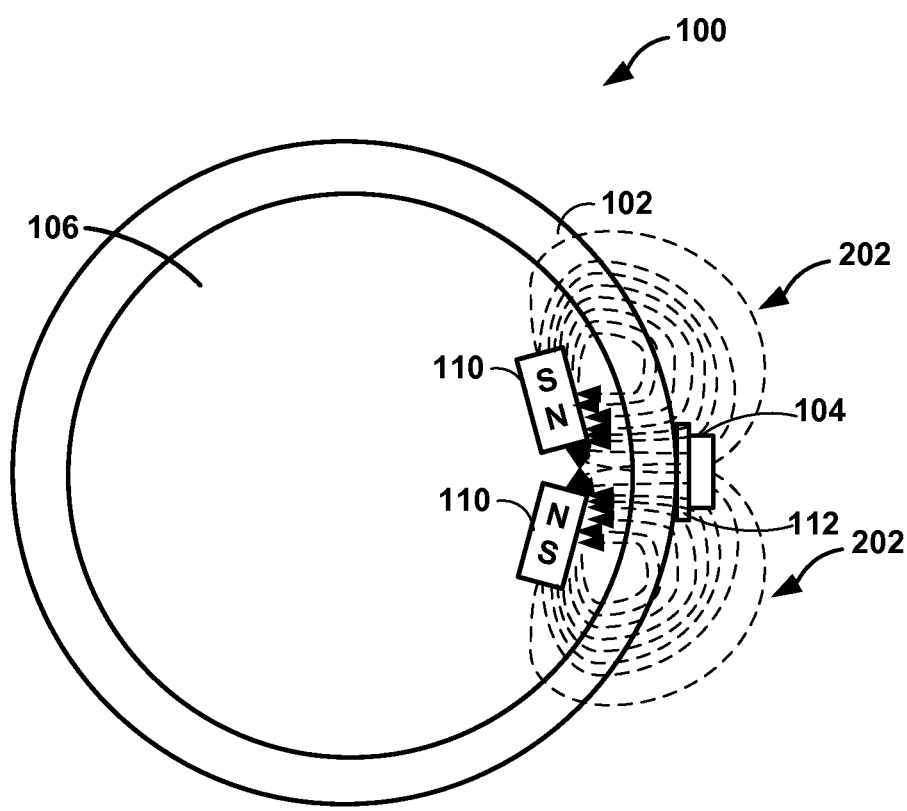
FIGS. 2A-2B are conceptual diagrams illustrating a magnetic field generated by magnets according to aspects of the present disclosure.
Figure 2B:
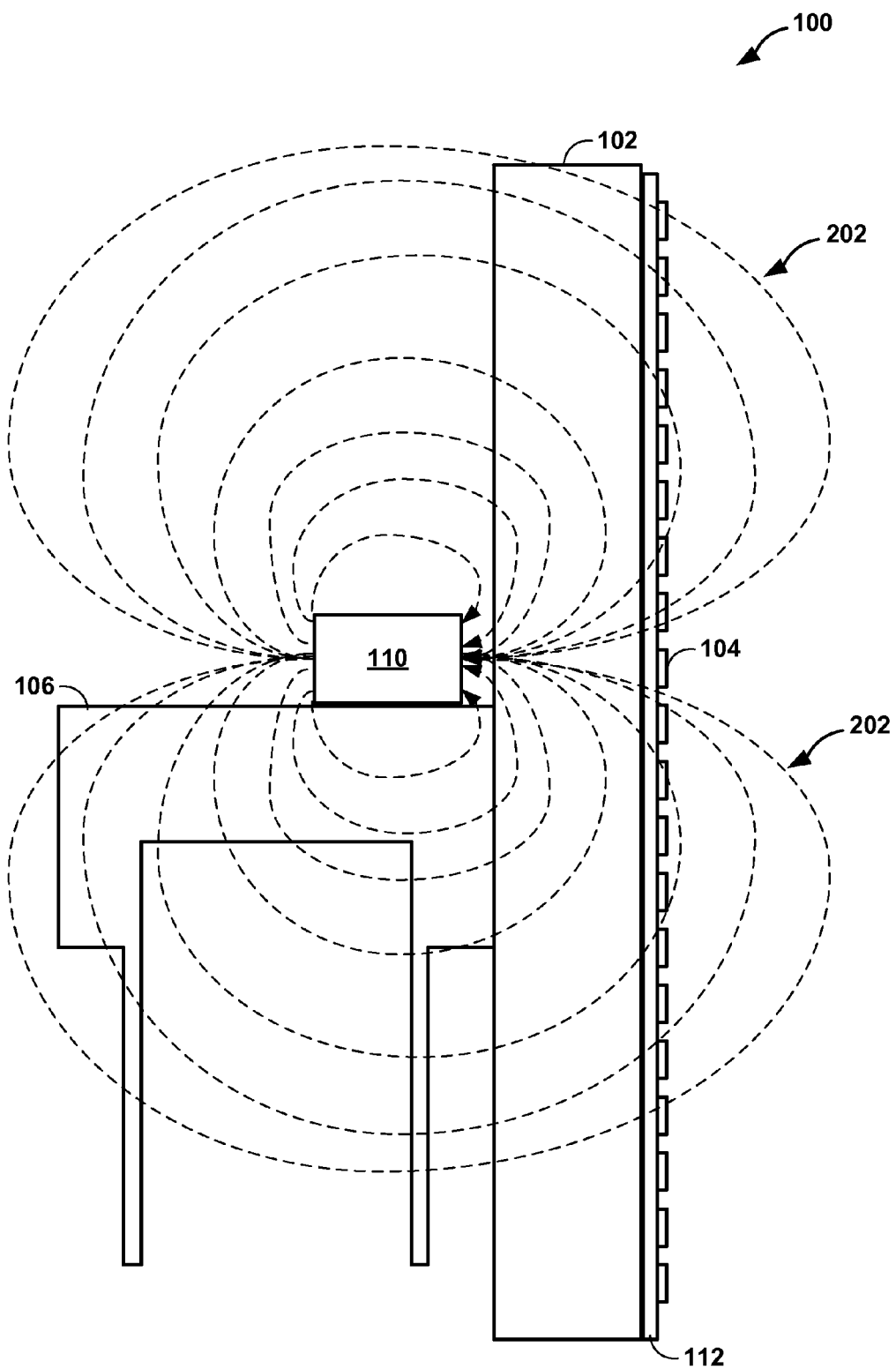

FIGS. 2A-2B are graphical diagrams illustrating the magnetic field 202 generated by magnets 110 according to aspects of the disclosure. As shown in FIGS. 2A-2B, magnetic field 202 generated by magnets 110 may extend beyond the walls of housing 102 of linear actuator 100, so that magnetic field 202 may be measured by sensors 104 disposed on sensor strip 112.

Figure 2C:
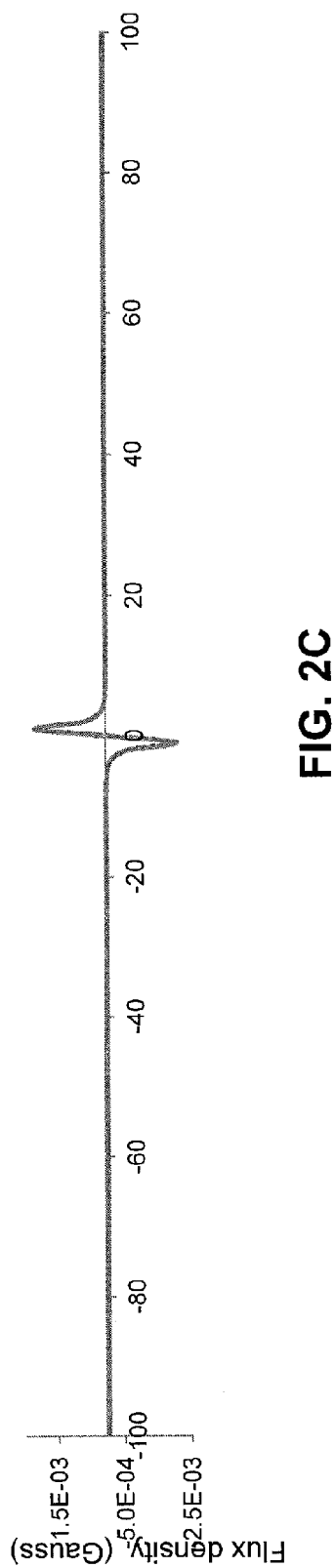
FIG. 2C is a conceptual diagram illustrating the magnetic field of magnets detected by a sensor in sensors based on the location of magnets relative to the sensor according to aspects of the present disclosure.

FIG. 2C is a conceptual diagram illustrating the magnetic field of magnets 110 detected by a sensor in sensors 104 based on the location of magnets 102 relative to the sensor according to aspects of the present disclosure. As shown in FIG. 2C, the minimum and maximum magnetic field produced by magnets 110 in the Z-axis (direction of the applied field) is measured by the sensor when magnets 110 are at their closest to the sensor, and the magnetic field measured by the sensor is about zero when magnets 110 are relatively further away from the sensor. The magnetic field measured by the sensor has an upward slope between its minimum and maximum, so that if the magnetic field measured by the sensor has an upward slope, then it is likely that magnet 110 is near the sensor. In some examples, the z-axis may be parallel to the travel path of piston 106.

Figure 2D:
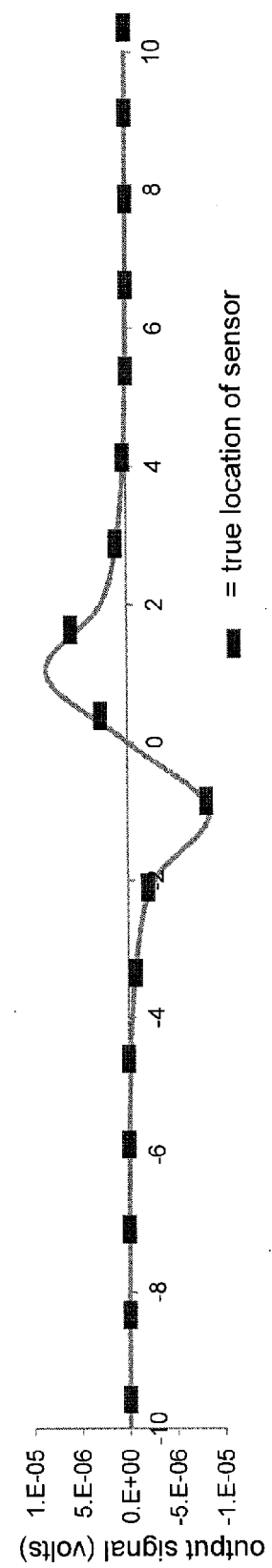
FIG. 2D is a conceptual diagram illustrating the output signal of a sensor in sensors based on the location of magnets 102 relative to the sensor according to aspects of the present disclosure.

FIG. 2D is a conceptual diagram illustrating the output signal of a sensor in sensors 104 based on the location of magnets 102 relative to the sensor according to aspects of the present disclosure. As shown in FIG. 2D, the voltage output by the sensor may correlate with the magnetic field measured by the sensor, so that the sensor outputting its minimum and maximum voltages may correspond to the sensor measuring the minimum and maximum magnetic fields generated by magnets 102. Similar to the magnetic field, the voltage outputted by the sensor has an upward slope between its minimum and maximum Based on the measurements and outputs of a plurality of sensors 104, the sensor that is nearest to piston 106 may be determined, and correspondingly the position of piston 106 within housing 102 may be determined based on the position of the determined sensor. For a given position of piston 106, the output voltages of a subset of the plurality of sensors 104 may be continuously measured, and the sensor that is closest to piston 106 may be determined based on the output of the sensor.

Figure 3A:
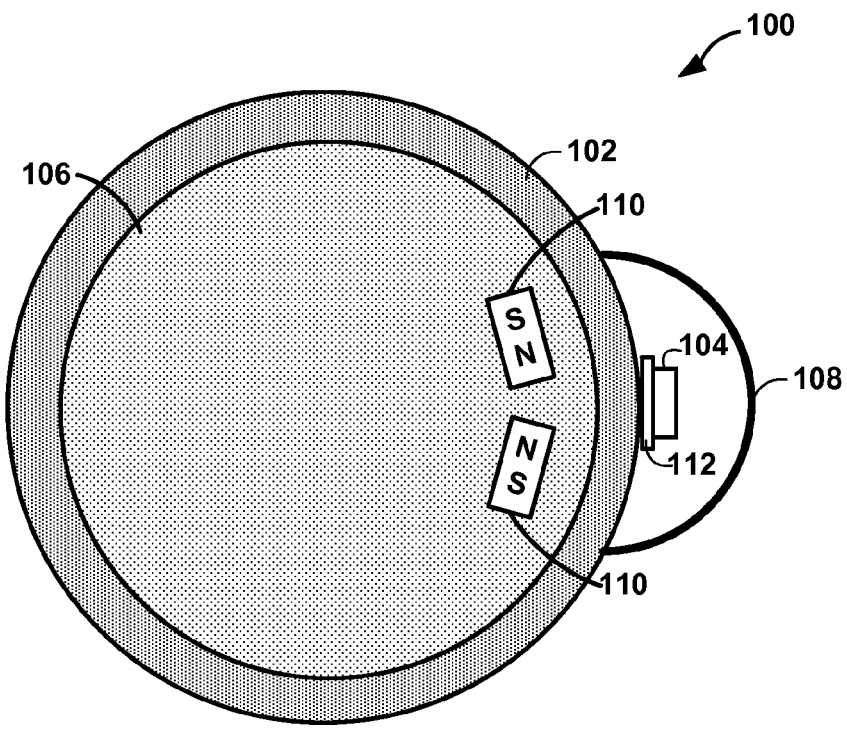
FIGS. 3A-3B are conceptual diagrams illustrating section views of an example linear actuator according to aspects of the disclosure.
Figure 3B:
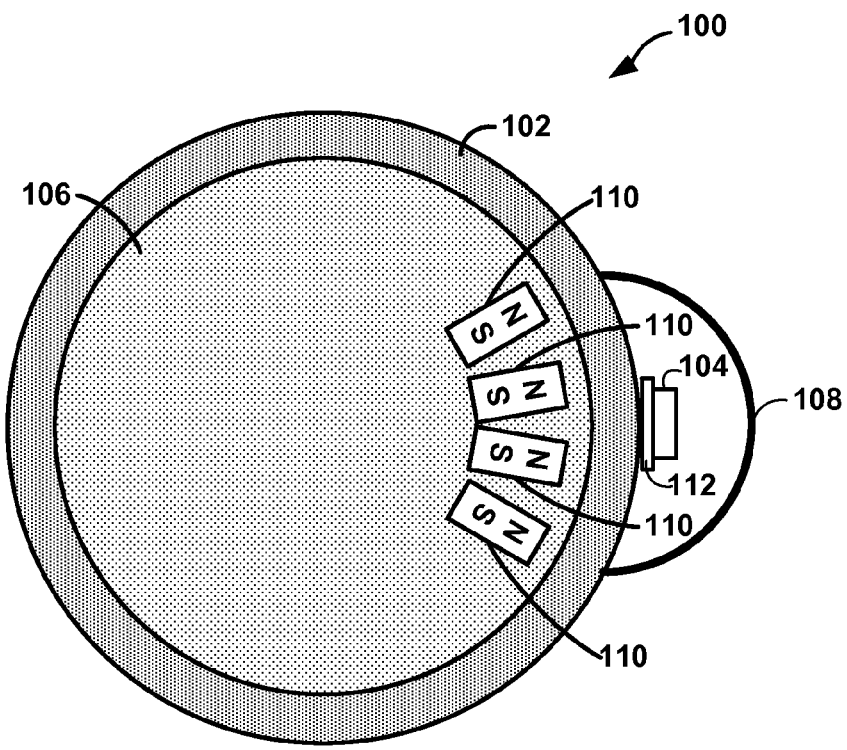

FIGS. 3A-3B are conceptual diagrams illustrating section views of an example linear actuator according to aspects of the disclosure. As shown in FIG. 3A, piston 106 may be cylindrical in shape, and magnets 110 may be disposed so that they are tangentially aligned with respect to the circumference of the piston 106. As shown in FIG. 3B, magnets 110 may be disposed so that they are radially aligned with respect to the circumference of the piston 106. Magnets 110 may be disposed on or in piston 106 so that they generate a magnetic field that is below 10 Gauss as measured by sensors 104 after passing through the walls of housing 102, so that the sensors 104 are not at risk of flipping its easy axis. In some examples, the walls of housing 102 may weaken the magnetic field by about a factor of 1000. One or more magnets 110 may be disposed on or within piston 106. For example, one, two, or four magnets 110 may be disposed together on or within piston 106.

Magnets 110 may also be disposed on or in piston 106 to maximize the uniformity of the magnetic field generated by magnets 110 if piston 106 rotates by about 10 degrees. For example, if magnets 110 are radially-aligned as shown in FIG. 3B, then the magnets 110 may be disposed about 6 degrees from each other. If magnets 110 are tangentially-aligned as shown in FIG. 3B, then the magnets 110 may be disposed about 40 degrees from each other.

Magnets 110 may not be axially aligned. A potential issue with axially aligned magnets may occur at the ends of the piston 106's travel. Typically, cylinders such as linear actuator 100 have steel guard rings or other steel features at the ends of travel that perturb the magnetic fields generated by magnets 110. The perturbations to the fields can be greater with axially aligned magnets than with radially-aligned or tangentially-aligned magnets. These perturbations in the field may make it more difficult to develop algorithms that can accurately interpret the piston 106's position within housing 102. Aspects of this disclosure, with its radially and/or tangentially aligned magnets may enable better algorithms, better accuracy and more precision in determining the piston 106's position, particularly at the ends of travel. Additionally, it can be difficult and expensive to machine grooves in a piston that can accommodate axially-aligned magnets.

Aspects of this disclosure, with its radially and/or tangentially aligned magnets, may enable lower manufacturing costs compared to other cylinders using axially-aligned magnets.

Figure 4A:
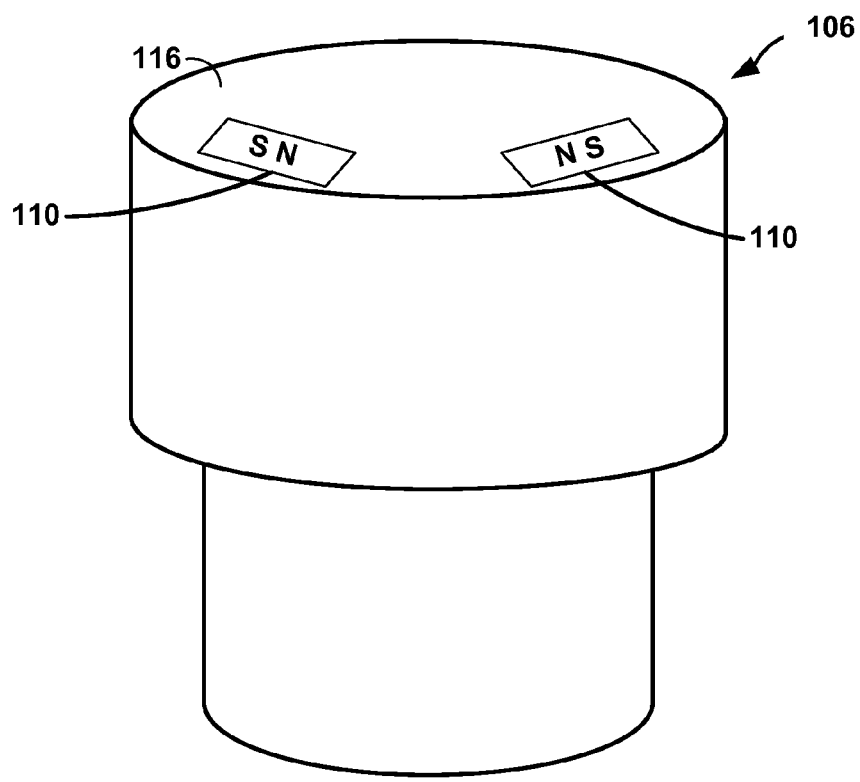
FIG. 4A-4F are conceptual diagrams illustrating perspective views of an example piston according to aspects of the disclosure.
Figure 4B:
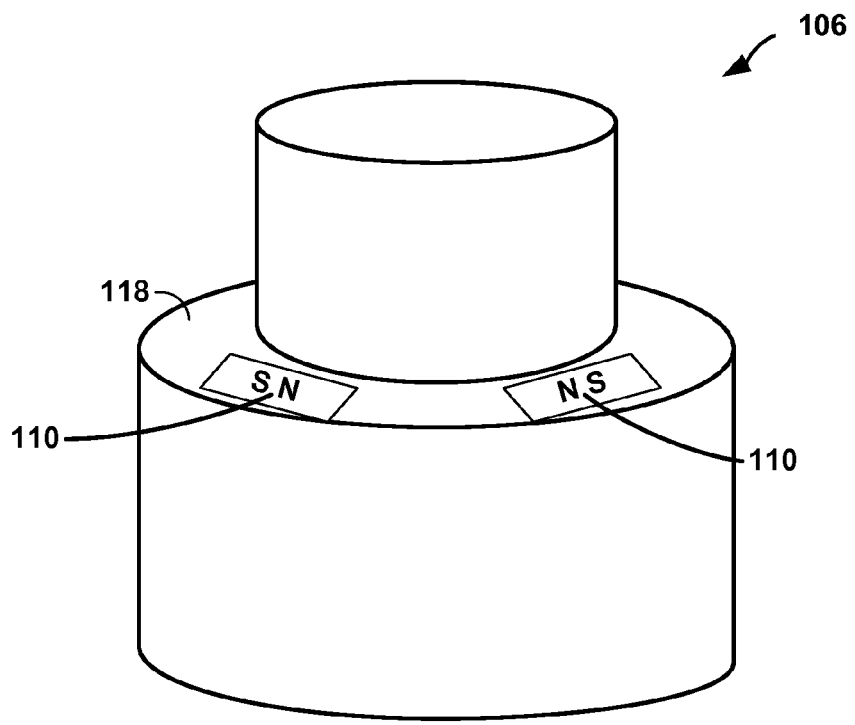
Figure 4C:
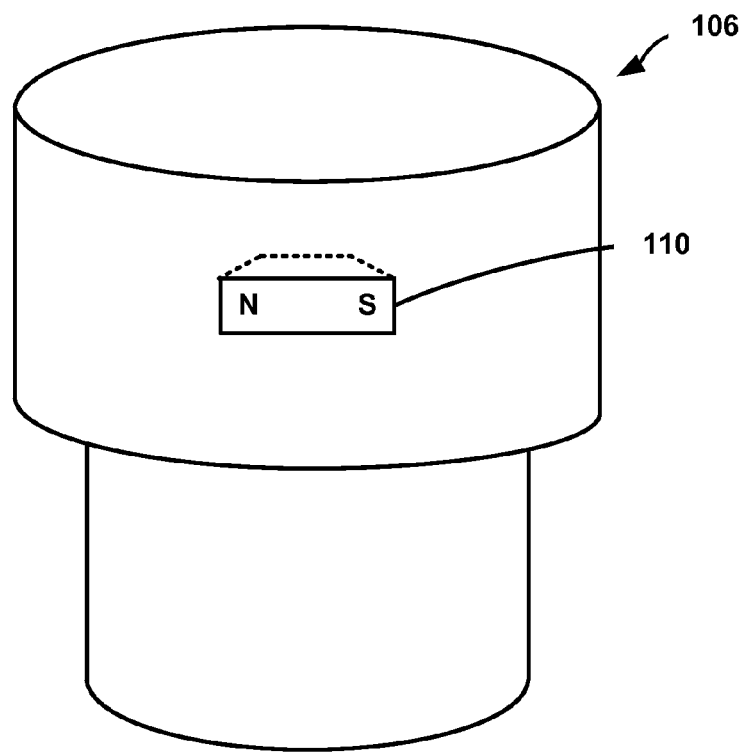
Figure 4D:
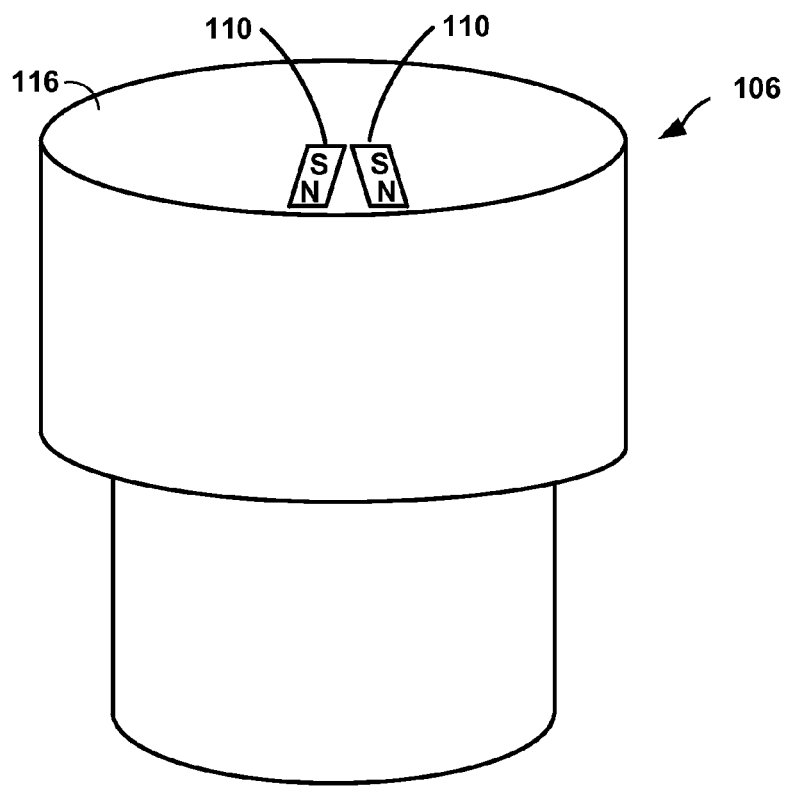
Figure 4E:
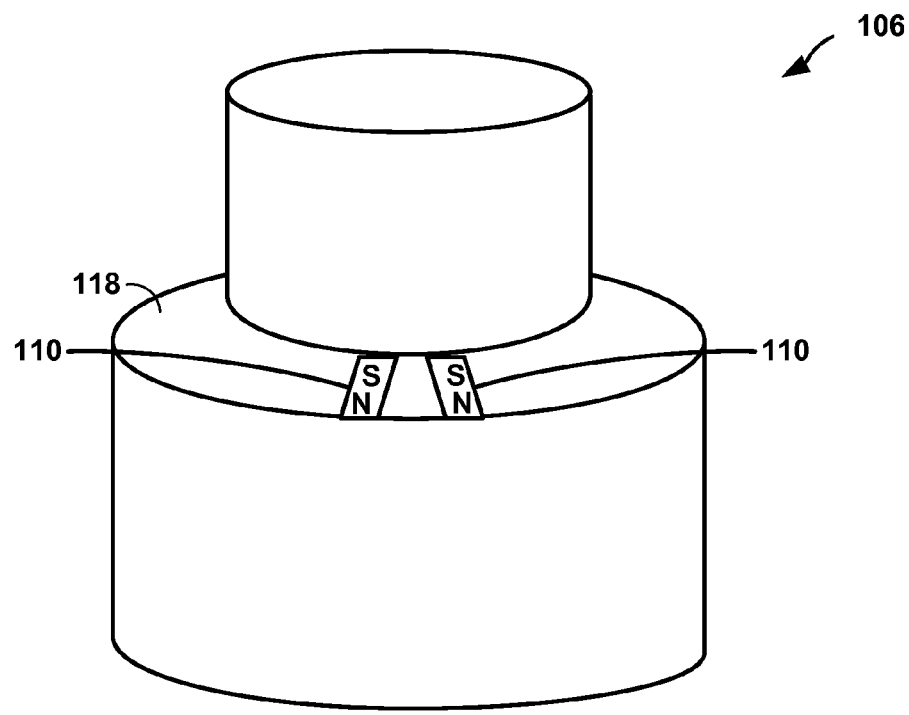
Figure 4F:
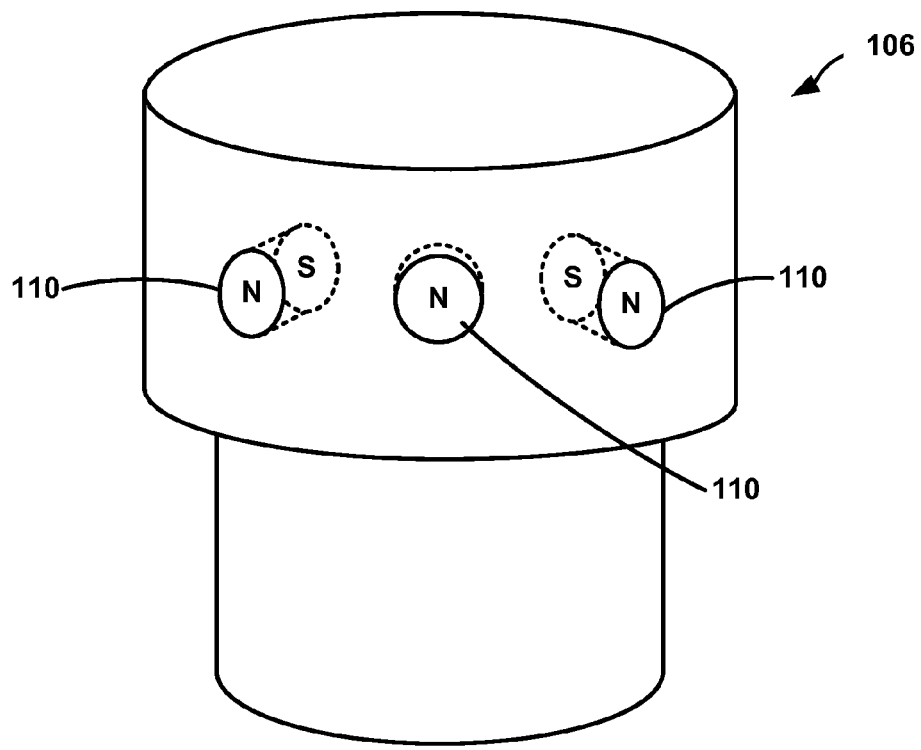

FIG. 4A-4F are conceptual diagrams illustrating perspective views of an example piston according to aspects of the disclosure. As shown in FIG. 4A, tangentially-aligned magnets 110 may be disposed on surface 116 of piston 106. As shown in FIG. 4B, tangentially-aligned magnets 110 may also be disposed on surface 118 of piston 106. As shown in FIG. 4C, tangentially-aligned magnets 110 may also be embedded within piston 106. As shown in FIG. 4D, radially-aligned magnets 110 may be disposed on surface 116 of piston 106. As shown in FIG. 4E, radially-aligned magnets 110 may be disposed on surface 118 of piston 106. As shown in FIG. 4F, radially-aligned magnets 110 may be embedded within piston 106. In some examples, magnets 110 may be disposed on more than one of surface 116 and surface 118. For example, magnets 110 may be disposed on both surface 116 and surface 118.

Figure 5:
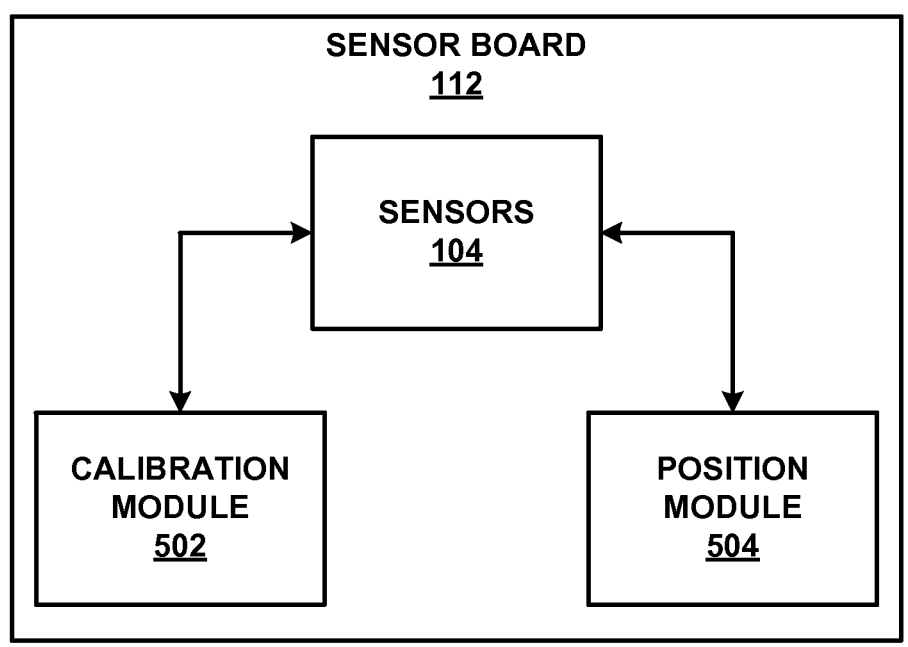
FIG. 5 is a block diagram illustrating the components of an example sensor board according to aspects of the present disclosure.

FIG. 5 is a block diagram illustrating the components of an example sensor board according to aspects of the present disclosure. As shown in FIG. 5, sensor board 112 may include sensors 104, calibration module 502, and position module 504.

Sensors 104 may include any sensor capable of detecting the magnetic field produced by magnets 110, such as a AMR sensor or a TMR sensor. In some examples, sensors 104 may measure the magnitude of the magnetic field produced by magnets 110. In other examples, sensors 104 may measure the direction and/or a combination of the magnitude and the direction of the magnetic field produced by magnets 110. More specifically, sensors 104 may measure the magnetic field produced by magnets 110.

Calibration module 502 may be operable to calibrate the output of sensors 104 so that the output of sensors 104 may more accurately indicate the location of piston 106 within housing 102, including minimizing the distortions caused by any residual magnetic field retained by housing 102, minimizing the distortions caused by cap end 101 and rod end 103 of housing 102 as piston 106 travels near cap end 101 and rod end 103 of housing 102, and minimizing the variances in each of the sensors 104. Calibration module 502 may also adjust sensors 104 to compensate for long term drift in the magnetic field, the strength of background magnetic fields, variances in the operating temperature, and any other factors which may affect the magnetic field measured by sensors 104.

To calibrate the output of sensors 104, calibration module 502 may, for each sensor in sensors 104, compare predicted minimum and maximum output values against actual minimum and maximum values outputted by each sensor as piston 106 moves within housing 102. The predicted minimum and maximum output values may be minimum and maximum output values predicted using finite element models. For example, the output of each sensor of sensors 104 may be scaled based on the predicted and actual minimum/maximum values so that each sensor in sensors 104 may be normalized to have the same sensitivity and output. The output of each sensor of sensors 104 may also be shifted so that the minimum and maximum values of each sensor overlay on top of each other. The output from sensors 104 may be averaged to create an ideal output curve, and that curve may be stored by calibration module 502.

Calibration module 502 may continually calibrate sensors 104 as the piston travels within housing 102, so that the output of sensors 104 may be re-calibrated and re-scaled based on the newly-measured minimum and maximum values. For example, whenever piston 106 and magnets 110 are known to be so far away from a sensor so that the sensor outputs close to a zero, that sensor may be re-nulled by calibration module 502. By calibrating sensors 104 in this fashion, the position of piston 106 may be determined to within 1 millimeter.

Position module 504 may be operable to determine the location of piston 106 within housing 102 based on the output of sensors 104. As discussed above with respect to FIGS. 2C and 2C, for a given position of piston 106, the output voltages of a subset of the plurality of sensors 104 may be received by position module 504. Output from sensors near the previous sensor determined to be closest to piston 106 may be read, and out of those sensors the sensor having an output curve that best fits the ideal curve is determined to be closest to piston 106. The position of piston 106 may correspond to the location of the sensor along the length of the cylinder making up housing 102.

In some examples, calibration module 502 and position module 504 may be hardware, software operable on one or more programmable processors, or a combination of hardware and software. For example, calibration module 502 and position module 504 may be firmware or programmable logic devices.

Figure 6:
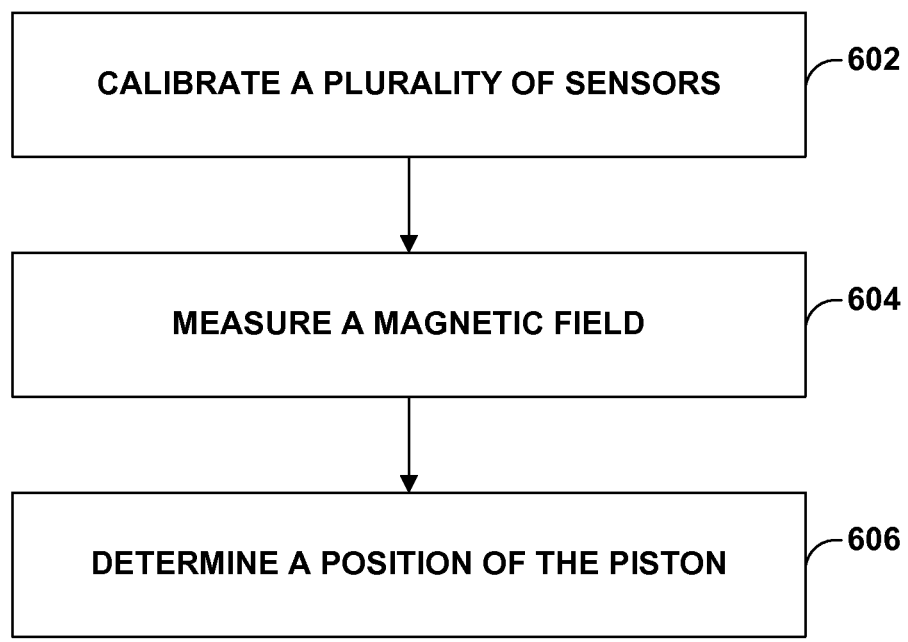
FIG. 6 is a flowchart illustrating a method for determining a position of a piston within a linear actuator according to aspects of the disclosure.

FIG. 6 is a flowchart illustrating a method for determining a position of a piston within a linear actuator according to aspects of the disclosure. As shown in FIG. 6, the method may include calibration module 502 calibrating a plurality of sensors 104 disposed on an exterior of a linear actuator 100 to normalize output of the plurality of sensors 104 (602). The method may further include measuring, by the plurality of sensors 104, a magnetic field produced by one or more magnets 110 operably coupled to a piston 106 within the linear actuator 100, wherein the one or more magnets 110 are disposed radial or tangential to the circumference of a first end surface 116 or a second end surface 118 of the piston 106 (604). The method may further include position module 504 determining, based on output from the plurality of sensors 104, a position of the piston 106 within the linear actuator 100 (606).

In some examples, calibrating the plurality of sensors 104 may further comprise determining minimum and maximum output values for each of the plurality of sensors 104. In some examples, the one or more magnets 110 are disposed on at least one of the first end surface 116 and the second end surface 118 of the piston 106. In some examples, the one or more magnets 110 may be embedded into the piston 106. In some examples, the plurality of sensors 106 may include a plurality of anisotropic magneto-resistive (AMR) sensors. In some examples, measuring the magnetic field may further comprise measuring a magnitude of the magnetic field produced by the one or more magnets 110. In some examples, measuring the magnetic field may further comprise measuring a direction of the magnetic field produced by the one or more magnets 110. In some examples, the plurality of sensors may comprise a plurality of tunneling magneto-resistive (TMR) sensors. Various aspects of the disclosure have been described. These and other aspects are within the scope of the following claims.

The invention claimed is:
1. An apparatus comprising:
a housing;
a piston including first and second end surfaces, wherein the piston is cylindrical, wherein the piston is disposed within the housing, and wherein the piston is operable to move reciprocally within the housing;
one or more magnets operably coupled to the piston, wherein the one or more magnets are disposed radial or tangential to the circumference of a first end surface or a second end surface of the piston;

a plurality of sensors disposed on an exterior of the housing and configured to sense a magnetic field produced by the one or more magnets to determine a position of the piston within the housing; and a calibration module configured to calibrate the plurality of sensors to produce normalized output from the plurality of sensors, wherein to normalize output of the plurality of sensors, each sensor's output is scaled based on an actual minimum value and an actual maximum value output by each sensor.

2. The apparatus of claim 1, wherein the one or more magnets are disposed on at least one of the first end surface and the second end surface of the piston.

3. The apparatus of claim 1, wherein the one or more magnets are embedded into the piston.

4. The apparatus of claim 1, wherein the plurality of sensors comprises a plurality of anisotropic magneto-resistive (AMR) sensors.

5. The apparatus of claim 4, wherein the plurality of sensors measures a magnitude of the magnetic field produced by the one or more magnets.

6. The apparatus of claim 4, wherein the plurality of sensors measures a direction of the magnetic field produced by the one or more magnets.

7. The apparatus of claim 1, wherein the housing comprises a cylinder.

8. The apparatus of claim 7, wherein the plurality of sensors comprises a linear array of sensors along the cylinder corresponding to a path of movement of the piston within the cylinder.

9. The apparatus of claim 1, wherein the plurality of sensors comprises a plurality of tunneling magneto-resistive (TMR) sensors.

10. The apparatus of claim 1, wherein the housing is made of metal.

11. The apparatus of claim 1, further comprising a protective housing that covers the plurality of sensors.

12. A method comprising:

calibrating a plurality of sensors disposed on an exterior of a linear actuator to normalize output of the plurality of sensors, wherein to normalize output of the plurality of sensors, each sensor's output is scaled based on an actual minimum value and an actual maximum value output by each sensor;

measuring, by the plurality of sensors, a magnetic field produced by one or more magnets operably coupled to a piston within the linear actuator, wherein the one or more magnets are disposed radial or tangential to the circumference of a first end surface or a second end surfaces of the piston; and determining, based on output from the plurality of sensors, a position of the piston within the linear actuator.

13. The method of claim 12, wherein the calibrating further comprises determining minimum and maximum output values for each of the plurality of sensors.

14. The method of claim 12, wherein the one or more magnets are disposed on at least one of the first end surface and the second end surface of the piston.

15. The method of claim 12, wherein the one or more magnets are embedded into the piston.

16. The method of claim 12, wherein the plurality of sensors comprises a plurality of anisotropic magneto-resistive (AMR) sensors.

17. The claim of claim 12, wherein measuring the magnetic field further comprises measuring a magnitude of the magnetic field produced by the one or more magnets.

18. The method of claim 12, wherein measuring the magnetic field further comprises measuring a direction of the magnetic field produced by the one or more magnets.

19. The method of claim 12, wherein the plurality of sensors comprises a plurality of tunneling magneto-resistive (TMR) sensors.

* * * * *